DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 27, 1973

916. O.G. 1212

T916,006

METHOD FOR PREPARING FIRE-RETARDANT POLYESTER CARPETS

Kenneth R. Barton, 201 Claymore Drive, Kingsport, Tenn. 37663; Robert R. Sanders, Rte. 3, Church Hill, Tenn. 37642; and Willis C. Wooten, Jr., 521 Lakewood Road, Kingsport, Tenn. 37660

Filed Mar. 30, 1973, Ser. No. 346,512

Int. Cl. C08g *17/14*

U.S. Cl. 117—137

No Drawing. 7 Pages Specification

Disclosed is a process for preparing polyester carpets that will pass the Methenamine Tablet Test comprising applying to a carpet of polyester fiber an organic bromine compound of at least 6 carbon atoms, the organic bromine compound containing, based on the weight of the organic bromine compound, from about 40 to about 85 weight percent bromine, and thereafter, heating the fiber in a temperature range of about 100 to about 220° C. for a suitable time to diffuse into the fiber structure a sufficient quantity of organic bromine compound to result in, based on the weight of the fiber, from 0.5 to 2.0 weight percent bromine in the fiber structure.